United States Patent [19]

Manner

[11] Patent Number: 5,594,325

[45] Date of Patent: Jan. 14, 1997

[54] SPACECRAFT POWER SYSTEM ARCHITECTURE TO MITIGATE SPACECRAFT CHARGING EFFECTS

[75] Inventor: David B. Manner, 1035 Burntwood Dr., Medina, Ohio 44256

[73] Assignees: David B. Manner; Brooke Schumm, III, both of Medina, Ohio

[21] Appl. No.: 513,475

[22] Filed: Aug. 10, 1995

[51] Int. Cl.[6] .................................................. G05F 1/56
[52] U.S. Cl. ........................................................ 323/282
[58] Field of Search ..................................... 323/222, 266, 323/282, 285, 901; 363/40, 41, 49, 63

[56] References Cited

U.S. PATENT DOCUMENTS

| 4,691,159 | 9/1987 | Ahrens et al. ......................... 323/222 |
| 4,899,269 | 2/1990 | Rouzies ................................... 363/41 |
| 5,394,075 | 2/1995 | Ahrens et al. ........................... 320/39 |
| 5,444,358 | 8/1995 | Delepaunt .............................. 323/282 |
| 5,451,858 | 9/1995 | Van Duyne et al. ................... 323/281 |

OTHER PUBLICATIONS

NASA Technical Memorandum 103717, Findings of the Joint Workshop on Evaluation of Impacts of Space Station Freedom Ground Configurations, Dale C. Ferguson, David B. Snyder R. Carruth Oct. 9, 1990.

Sputtering and SSF Implications, D. C. Ferguson Aerospace Technology Research Project Review NASA Lewis Research Center, Aerospace Technology Directora Power Technology Division Mar. 6, 1991.

*Primary Examiner*—Matthew V. Nguyen
*Attorney, Agent, or Firm*—Daneker, McIntire & Davis, P.C.

[57] ABSTRACT

A power system architecture for a spacecraft and a method of a power supply for a spacecraft are presented which take advantage of the reduced plasma interaction associated with positive ground high voltage photovoltaic arrays and provide a negative ground power supply for electrical loads of the spacecraft. They efficiently convert and regulate power to the load bus and reduce power system mass and complexity. The system and method ground the positive terminal of the solar arrays to the spacecraft hull, and using a power converter to invert the electric sign, permit a negative ground for the electrical distribution bus and electrical components. A number of variations including a load management system and a battery management system having charging and recharging devices are presented.

46 Claims, 3 Drawing Sheets

SPACECRAFT POWER SYSTEM ARCHITECTURE TO MITIGATE SPACECRAFT CHARGING EFFECTS

This invention was made with Government support under contract NAS3-25266 awarded by NASA. The Government has certain rights in this invention.

BACKGROUND OF THE INVENTION

The low earth orbit of a spacecraft is surrounded by the "plasma" of which space is composed, space not being quite empty, and being even less empty close to objects such as earth having a gravitational force. The plasma, also called space plasma, is composed of neutrally charged particles having no electrical charge, negatively charged electrons, and various positively charged ionic species. The positive ionic species are much more massive on an atomic scale than electrons, and therefore possess a lower thermal velocity. Even though the plasma is neutral, the electron current density in a particular direction is greater than the ion current density. As a result, when a spacecraft is immersed in the low earth orbit plasma, the exterior surface of the spacecraft will tend to accumulate a negative charge. As the spacecraft accumulates charges, the resulting negative electric field begins to repel electrons while attracting the positive ions. Charging continues until an equilibrium potential is reached, resulting in no net current being collected. In low earth orbit, with no voltage potential created inside the spacecraft to change the exterior surface voltage potential, the equilibrium potential is roughly a few volts negative with respect to the surrounding space plasma potential.

Negative charge, even if only a few volts negative, attracts the relatively massive positively charged ionic species. At low voltages, that is not too much of a problem. However, advanced spacecraft have higher power demand. Power and energy are a function of volts times amperage. Wattage= volts x amps. In order to increase power without increasing the voltage, one solution is to increase the amperage.

The difficulty with increasing amperage, as explained below, is that it adds weight and mass and generates heat. If the amperage is increased to meet increased internal power demand of the spacecraft, the size of wire and electrical connection must be increased, adding to the weight of a spacecraft. Each pound of increased weight of a spacecraft increases launch cost.

Because of launch cost, there is a premium on volume and hundreds of electrical and electronic components are placed into a spacecraft because of the launch cost. For higher wattage (which is equal to amps squared times resistance) without higher voltage, there must be higher amperage, which generates unacceptable heat from the electrical loads in the spacecraft. The higher amperage tends to generate more heat in the electrical components, and means that overheating of close packed electrical components is more likely to occur, requiring more spacing of components in contradiction to the objective of maximizing the use of volume.

Further, the current carrying capacity of a wire of given cross-sectional area is limited because a smaller wire has a higher resistance per given linear measure. Thus to increase the amperage, the cross-section of the wire must be increased which is undesirable because of the added mass of the wiring and wiring harness.

The alternative solution to meet the higher power demand is to increase the voltage. If the system could be operated at higher voltage for a given power demand, such higher voltage would reduce the amperage requirement and the weight of the spacecraft.

Power for a spacecraft, on a long-term basis, is generated using multiple solar cells in solar arrays. Each solar cell generates a small voltage potential between two terminals, a positive and a negative terminal, and generates a small direct current measured in amps. To achieve high voltages, the solar cells are linked in series, as in a string, with the terminals at each end, "adding" the voltages. To increase the amperage without changing the voltage, the strings of solar cells are linked in parallel which increases the available amperage at the terminals of the solar cell array.

Higher array voltages, unfortunately, intensify the electromagnetic interaction between the spacecraft and the space plasma under present spacecraft designs. A spacecraft in low earth orbit can experience many adverse effects on the solar arrays and the spacecraft. These effects include sputtering of spacecraft surfaces, contamination of the surfaces and arcing. The magnitude of these effects and areas affected on the exterior of the spacecraft depends mainly on the voltage level of the solar arrays and on the grounding configuration of the power system. The sputtering effect is one of erosion of all spacecraft materials exposing underlying regions to atomic oxygen attack. A power system which is negatively grounded to the hull can also suffer arcing effects between the plasma and underlying negatively charged spacecraft surfaces if the dielectric strength of the insulating material for the power feed from a solar array is exceeded. If arcing occurs, pinholes in the insulating material surface occurs exposing the structure to the space plasma, which causes enhanced sputtering to the hull because plasma ions are focused to the pinhole edges by the large electric fields. Material that escapes from the sputter surface is a source of contamination to the spacecraft and in particular affects the solar arrays and certain thermal surfaces. This phenomenon is described and published in NASA Technical Memorandum 103717, "Findings of the Joint Workshop on Evaluation of Impacts of Space Station Freedom Ground Configurations," D. C. Ferguson, D. B. Snyder, and R. Carruth (Nat'l Tech. Inf. Serv., Springfield, Va. 1990). The significance of the sputtering problem was also discussed in presentation in NASA "Sputtering and SSF Implications, D. C. Ferguson, Aerospace Technology Research Project Review, Mar. 6, 1991.

One possible solution is to positively ground the spacecraft hull or containing means from the positive terminal of the solar arrays, and then to link the positive side of the internal electrical components of the spacecraft to the positive hull. This is done, to put it simplistically, by simply connecting the positively charged terminal of the solar array(s) to the spacecraft hull or containing means.

Positively grounding the hull to the positive terminal does create differential potentials between the exposed spacecraft surfaces and the space plasma. They are too small, however, to cause concern. The exposed surfaces of the spacecraft will charge to a slightly positive potential compared to plasma potential. These small positive potentials repel massive positive ions that might cause sputtering.

The difficulty with this approach is that a positive ground architecture is not conventional for modern electronic technology. The choices among semiconductor p-channel devices normally associated with positive ground circuits are rather limited. The range of power, current, and voltage handling capabilities in available p-channel devices (devices having a positively charged case) are not nearly so broad as the range in n-channel devices which have broad availability (having a negatively charged case normally associated with negatively grounded circuits). Circuits using n-channel devices referred to positive ground tend to be rather complex resulting in attendant reliability and mass and weight penalties. Thus, a negative ground electrical system and spacecraft structure is preferable from the perspective of the designer of the internal electrical loads.

One solution to enable the use of a positively grounded hull with negatively grounded electronic devices which is known in the art is to use isolated transformer power architectures. A transformer permits the reversing of the voltage potential with relatively little loss of power for an isolated device. However, a transformer has a certain bulk and mass associated with it. A transformer uses a coupled inductance of at least two induction coils wound around and arranged apart on a metal, usually iron-based core, the "input" coil being called the primary coil or inductor and the "output" coil or inductor being called the secondary coil. In order for a transformer to work, the direct current from the solar cells must be converted to alternating current, which drives the primary coil, and then the output of the secondary coil must be rectified back into direct current. Transformers are relatively heavier and require complicated packaging of the power system and the electrical loads.

For Space Station Freedom, after the plasma effects of the planned 167V system had been confirmed, two remedial solutions were proposed to positively charge the spacecraft. One solution was to ground Space Station Freedom to the positive end of the solar array, but redesign of a number of important components, including the power conversion unit(s), to yield a negatively grounded system was required.

Ultimately, an alternative remedial solution was proposed in the form of a plasma contactor capable of pulling the highly negative spacecraft hull and structure up to the plasma potential. This was to be accomplished by building up a large effective electron emitting area, in the form of a plasma sheath generated by the plasma contactor. The plasma contactor is an active device expending xenon gas in its operation, and capable of pulling the entire solar array positive with respect to the space plasma.

This solution, aside from its complexity and redesign requirements of the power conversion unit(s), has costs in several ways. The currents collected the plasma, especially during times of high solar activity, will be a significant power drain on the system. Redundancy, and some control are required to ensure continuous operation. Contactor replacement or xenon gas replenishment will be necessary after a few years of operation. However, this is believed less expensive than redesigning the electronic components, the electrical system and overall design of the space station at this advanced stage of development.

SUMMARY AND OBJECTS OF INVENTION

The objects of this invention are to present a positive ground for the photovoltaic arrays and spacecraft exterior contacting the plasma, and to present a negative ground to the electrical loads. A further object is to achieve this with efficient mass and volume, and minimal power loss. The important element to accomplish this object is an efficient electronic power converter. Integration with recharging apparatus and energy storage devices such as batteries is also contemplated.

DESCRIPTION OF THE INVENTION

In this invention, in its basic form, the positive terminal of the means for converting solar energy to electricity, normally the photovoltaic array, including the solar cells and panels, is connected to the spacecraft hull or containing means. The negative terminal is connected through, but insulated from, the spacecraft hull to a power converter, which converter is discussed in a moment. The power converter reverses the electrical sign from negative to positive and that positive output is the input for the electrical loads of the satellite, be they communication devices, life support devices for a manned space station or the many other electrical and electronic devices one expects in a spacecraft. The electronic devices are grounded to a negative distribution bus.

The integration of a power converter with the electrical load(s) and the spacecraft is the key to the invention. The invention of the inventor was discussed in an unpublished paper "An Innovative Power System Architecture to Mitigate Spacecraft Charging Effects", by Dr. David B. Manner (the inventor), J. L. Herr, and D. C. Ferguson (submitted in January 1994 for review and decision on whether to be published to the American Institute of Aeronautics and Aviation ("AIAA") which publishes the Journal of Rocket Science (no decision has been made), which paper was prepared for internal NASA purposes as part of Contract No. NAS3-25266 with Sverdrup Technologies, Inc., the employer of the inventor, and was presented to NASA "Tiger Teams" TRansfer Orbit Plasma Interaction Experiment ("TROPIX") and Combined Lander and Instrumented Rover ("CLIR") in or about July, 1993. The invention has not been produced or accepted by NASA or Sverdrup Technologies, Inc. nor is it presently designated for use in Space Station Freedom or any other spacecraft.

Figure 1:
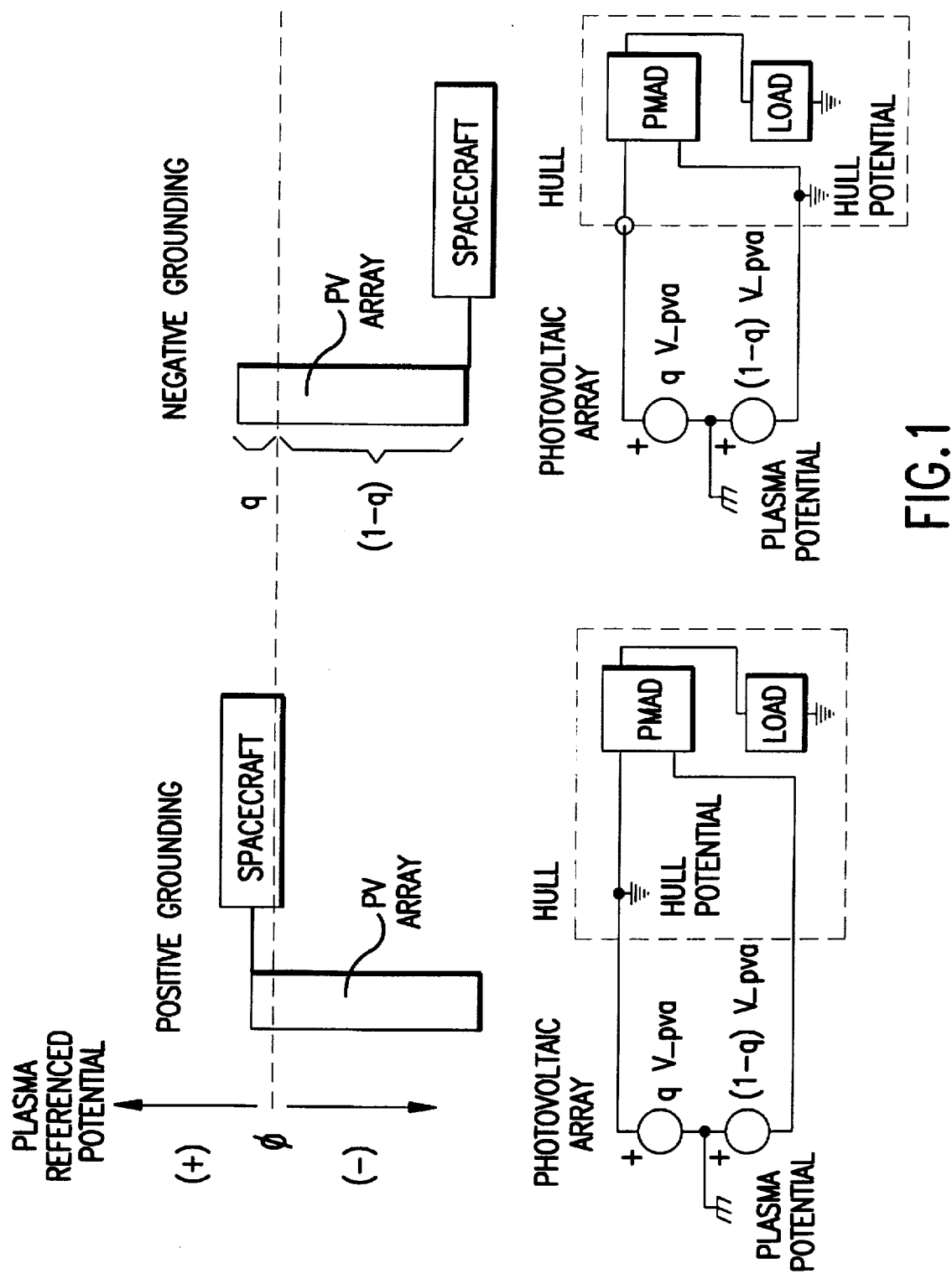
FIG. 1 illustrates in two subparts a presentation of positive grounding and negative grounding. In the top half of the subpart on the left half (illustrating positive grounding), the space plasma referenced potential for the spacecraft and its solar power arrays are shown, and in the bottom half of the subpart on the left half, the relative potentials of space plasma of the macro elements of the improved spacecraft power system are illustrated. The subpart on the right half for negative grounding is illustrated similarly, but shows the opposite space plasma referenced potential for the spacecraft. "PMAD" means power management and distribution. "V_pva" means photovoltaic array out voltage. The variable "q" refers to the floating potential fraction (0<q<1).
Figure 2:
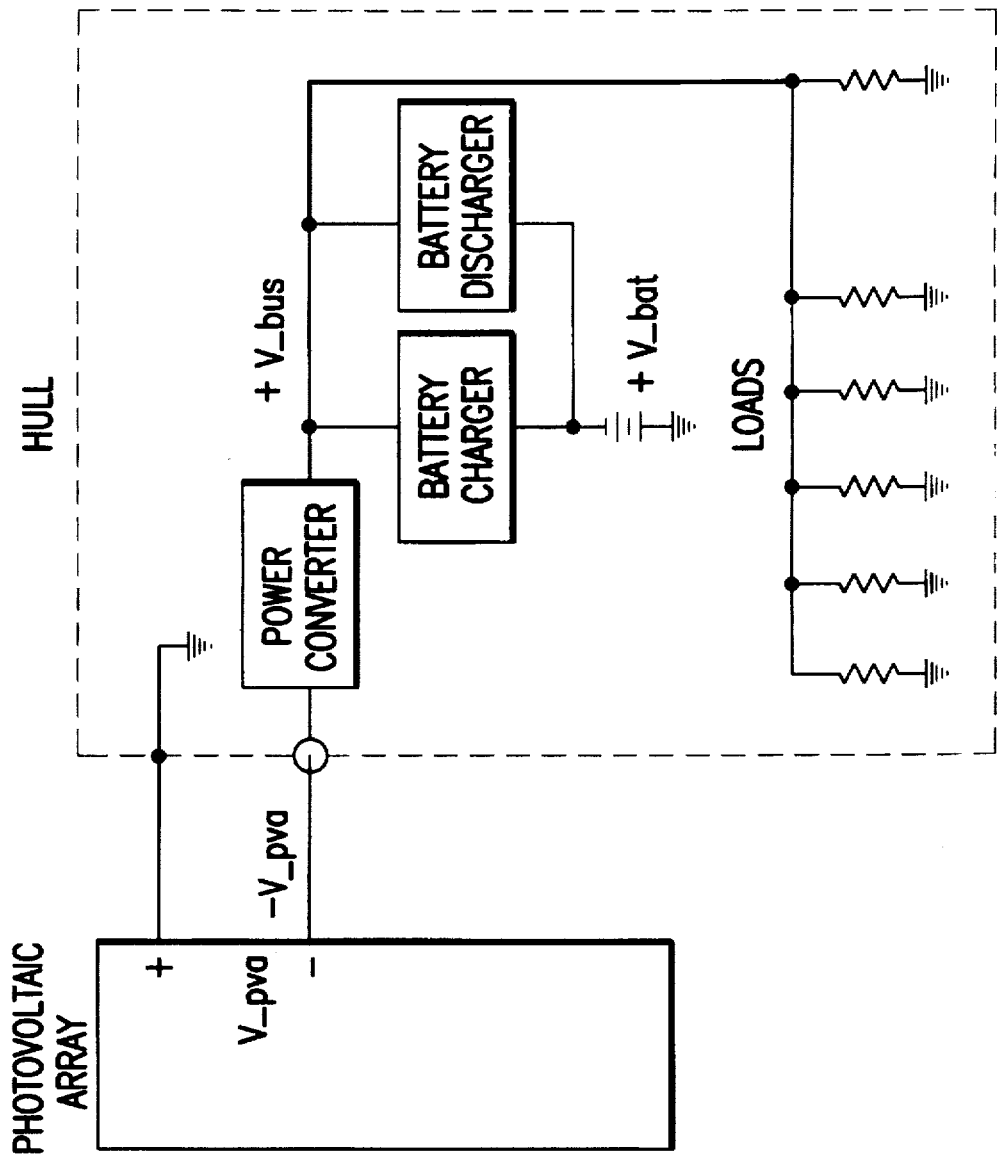
FIG. 2 illustrates in more detail the improved power system architecture. "V_pva" means photovoltaic array output voltage. "V_bus" means distribution bus voltage. "V_bat" means battery voltage.
Figure 3:
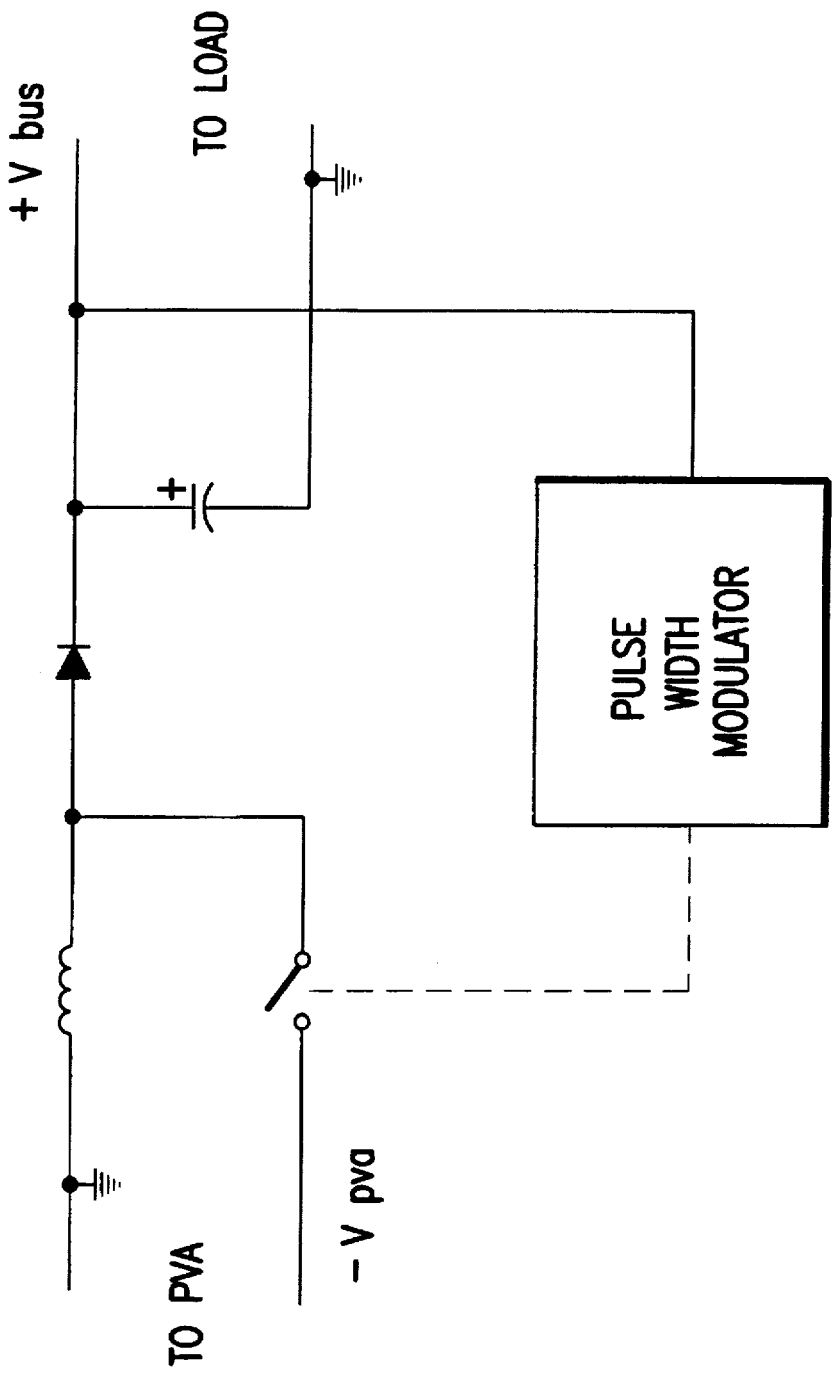
FIG. 3 illustrates the buck/boost power converter in a simplistic form with a pulse width modulator to regulate the voltage. "PVA" means photovoltaic array. "V bus" means distribution bus voltage. "V pva" means photovoltaic array voltage.

The power converter's basic element is an electronic energy storage device, i.e., an inductor and/or capacitor. It is referred to as a power converter having an electronic energy storage element. The invention preferably uses an electronic uncoupled inductance power converter and most preferably a buck/boost power converter. In an example of one of its simplest forms, this electronic uncoupled inductance power converter uses a single uncoupled inductor in conjunction with a rectifying means, capacitance means and switching means, as illustrated in FIG. 3. These types of power converters are known in the art, but a sense of the electronics in this example is helpful.

The power converter circuitry begins with an induction coil, which may be a single coil, as opposed to the at least two coils required in a transformer which always has at least a primary and secondary coil. One terminal of the inductor in the power converter is connected to the positively charged hull of the spacecraft. The other terminal of the power converter is connected to the connection to the negative terminal of the solar array. A "switch" to initiate operation of the power converter is typically on the connection between the inductor and the negative terminal of the solar array.

When the "switch" is closed, applying power to the system, the induction coil begins to have current flow through it. It is a principle of electronics that the current may not change instantaneously through an inductor. For an inductor of inductance "L", the voltage equals L times the rate of change of amperage. Put differently, if the voltage is given, the voltage divided by L tells you how fast current, measured in amps, will begin to flow through the inductor. If the "switch" is opened, "disconnecting" the circuit, inductor current continues to flow, because the current flow through the inductor cannot change instantaneously. The "switch" is controlled by a pulse width modulator, which is also well known in the art.

From the inductor, current is directed to a diode, set up to be a steering diode. A diode is a device that permits current to flow only one way, from positive to negative, i.e., it always has positive output from one terminal. For instance, household current, which is alternating current, and changes sign in a wave form, cannot alternate backwards across a diode. In the system in this invention, the current emerges from the negative side of the diode and is connected to and directed to the positive terminal of a capacitor.

The negative side of the capacitor is connected to the positively charged hull of the spacecraft, recalling again that this is connected to the positive terminal of the solar array. Another principle of electronics is that the voltage may not change instantaneously across a capacitor. For a capacitor of capacitance "C", the amperage equals C times the rate of change of voltage. Put differently, if the amperage is given, the amperage divided by C tells you how fast voltage will change across the capacitor.

The pulse width modulator is connected from the positive side of the capacitor to the negative terminal of the solar array. Because the current cannot change instantaneously across the inductor, and the voltage cannot change instantaneously across the capacitor, by varying how long the switch is open, and providing feedback in the circuit, the voltage across the capacitor can be stabilized.

Again simplistically, the "switch" is closed, and the inductor begins to allow current into the diode, but then the "switch" is opened. Because the current cannot change instantly on opening the "switch," and the diode prevents "backward flow" of electrons as the current and voltage fall on the inductor side of the circuit, what voltage is in the capacitor "stays" there. The "switch" again closes, again pushing more electrons into the capacitor, holding the voltage up, and then the "switch" opens again to stop the voltage from increasing too much. A stable electric potential to power an electrical load is therefore created between the spacecraft hull and the output terminal of the power converter which connects to the positive side of the capacitor. The power converter has thus effectively changed the sign of the voltage from positive to negative, the voltage across the capacitor is stable, and an electrical load across the capacitor side of the circuit can operate off of this voltage. As the level of load changes, feedback to the pulse width modulator varies the rate of opening and closing of the "switch" to maintain a steady state system.

Using electronic principles, the basic power converter circuit can also be arranged to meet the objects of this invention to use only one inductor or to use only one capacitor in the circuit to change the sign of the voltage from positive to negative, though the use of a single electronic energy storage element does not yield favorable stability of voltage.

By using the power converter connected with the electrical system, the overall objectives of a negative electrical ground for the electrical loads and positively grounded spacecraft hull and exterior are met by this system. Because the elements of the invention cooperate to charge the spacecraft hull a few volts positive compared to the space plasma, large damaging positive ions are actually repelled, wiring mass and weight are reduced, and heat production is reduced by reason of operation at higher voltage and lower amperage, allowing, among other benefits, increased proximity of electronic components and lower energy loss.

The power converter, including a buck/boost type of power converter, would normally contain circuitry responsive to the power demand which can modify the power output, and if need be modify the amount of input received from the solar arrays.

The best mode in which to employ this system is to use a number of "real world" variations. Normally, the positive terminal of the solar array is not directly connected to the spacecraft hull, but is indirectly connected through a "ground" internal to the spacecraft which is then connected to the spacecraft hull. The electrical result of positively charging the exterior of the spacecraft is still achieved. The negative side of the electrical loads, by virtue of the system design, are all "grounded" to this "ground." This ground functions as or is usually connected to a negative distribution bus.

The electrical loads contemplated vary widely. Any direct current (DC) loads will often have a designated positive terminal(s) which is referred to as the electrical load input terminal. The designated negative terminal(s) is referred to as the electrical load ground terminal. Certain alternating current (AC) loads may have a designated electrical load input terminal with the opposite terminal being the electrical load ground terminal. For DC loads which do not need to have a designated positive terminal, or for AC loads which do not have a designated electrical load input terminal, one terminal(s) should be arbitrarily designated an electrical load input terminal for purposes of this specification, and the opposite terminal(s) designated the electrical load ground terminal.

Normally, the spacecraft contains a battery management system for a number of reasons, including backup or auxiliary power. The battery management system normally has a battery charger. The battery management system includes a regulator of battery discharge, enhancing the stability of the electrical supply to the electrical loads. The battery management system also includes a charge regulator and may have a timing mechanism. All of these charging/recharging components and the batteries, and their equivalents together will be referred to as the battery management system.

Most favorably, the battery management system is connected across the output side of the power converter and the negative distribution bus. Also, a battery management system, in particular, can be connected directly or indirectly, between the terminals of the solar array. Other configurations of connection of the battery management system are known in the art.

The favored power converter is a "buck/boost" power converter which uses a pulse width modulation feedback scheme. Other electronic components can be added and the power converter can have considerably more complex circuitry as the electrical loads may demand.

If for some reason solar generated power were not needed or unavailable, the system may operate off of batteries only.

The satellite or spacecraft normally contains a load management system working from and with the battery management system, and timing and regulating power to the various electrical loads, all of which may be referred to as a power management and distribution system ("PMAD"). The load management system could be as simple as a single power distribution bus at a single voltage, but is likely to have timing mechanisms, power regulation features, and multiple voltage outputs with multiple power distribution busses in combination with the battery management system and selected electrical loads to variously power subparts of the overall satellite electrical load and power system. It may be used to vary the output from the power converter. The power from the solar arrays may vary and the load management system is designed to stabilize power in the spacecraft.

The embodiments represented herein are only a few of the many embodiments and modifications that a practitioner reasonably skilled in the art could make or use. The invention is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

What is claimed is:

1. An improved power system for a spacecraft for providing negatively grounded power to at least one electrical load at improved higher ambient voltages while reducing the voltage potential between said spacecraft and space plasma, said spacecraft having a spacecraft containing means, said power system having at least one means for generating electrical energy from solar energy, said at least one means for generating electrical energy from solar energy having at least one positive generator feed terminal and at least one negative generator feed terminal, and said at least one electrical load having at least one electrical load input terminal and having at least one electrical load ground terminal, said improved power system comprising:
  means for connecting said at least one positive generator feed terminal to said spacecraft containing means;
  at least one power converter to convert energy from negatively charged input into positively charged output having at least one electronic energy storage element;
  said at least one power converter having a power converter negative input feed and at least one power converter positive output feed;
  means for connecting said at least one negative generator feed terminal to said power converter negative input feed through said spacecraft containing means and electrically insulated from said spacecraft containing means;
  means for connecting said at least one power converter positive output feed and said at least one electrical load input terminal; and
  means for connecting said at least one positive generator feed terminal and said at least one electrical load ground terminal.

2. A claim according to claim 1, said power converter being at least one buck/boost power converter.

3. A claim according to claim 2, said at least one buck/boost power converter having at least one coupled inductance means.

4. A claim according to claim 2, said buck/boost power converter having at least one pulse width modulator to regulate voltage to said at least one electrical load.

5. A claim according to claim 4, said at least one buck/boost power converter having at least one coupled inductance means.

6. A claim according to claim 4, further comprising:
  at least one battery management system connected to said improved power system.

7. A claim according to claim 6, further comprising:
  at least one load management system connected to said improved power system.

8. A claim according to claim 7, further comprising:
  at least one means for providing feedback from said at least one load management system to said at least one buck/boost power converter; and
  at least one response means for modifying electrical output from said at least one buck/boost power converter responsive to said at least one means for providing feedback from said at least one load management system.

9. An improved power system for a spacecraft for providing negatively grounded power to at least one electrical load at improved higher ambient voltages while reducing the voltage potential between said spacecraft and space plasma, said spacecraft having a spacecraft containing means, said power system having at least one means for generating electrical energy from solar energy, said at least one means for generating electrical energy from solar energy having at least one positive generator feed terminal and at least one negative generator feed terminal, and said at least one electrical load having at least one electrical load input terminal and having at least one electrical load ground terminal, said improved power system comprising:
  at least one power converter to convert energy from negatively charged input into positively charged output having at least one electronic energy storage element;
  said at least one power converter having a power converter negative input feed and at least one power converter positive output feed;
  means for connecting said at least one negative generator feed terminal and said power converter negative input feed through said spacecraft containing means and electrically insulated from said spacecraft containing means;
  at least one power system common ground terminal;
  means for connecting said at least one positive generator feed terminal and said at least one power system common ground terminal through said spacecraft containing means and electrically insulated from said spacecraft containing means;

means for connecting said at least one power system common ground terminal and said spacecraft containing means;

means for connecting said at least one power converter positive output feed and said at least one electrical load input terminal; and means for connecting said at least one electrical load ground terminal and said at least one power system common ground terminal.

10. A claim according to claim 9, said at least one power converter being at least one buck/boost power converter.

11. A claim according to claim 10, said at least one buck/boost power converter having at least one coupled inductance means.

12. A claim according to claim 10, said at least one buck/boost power converter having at least one pulse width-modulator to regulate voltage to said at least one electrical load.

13. A claim according to claim 12, said at least one buck/boost power converter having at least one coupled inductance means.

14. A claim according to claim 10, further comprising:
at least one battery management system connected to said improved power system.

15. A claim according to claim 14, further comprising:
at least one load management system connected to said improved power system.

16. A claim according to claim 15, further comprising:
at least one means for providing feedback from said at least one load management system to said at least one buck/boost power converter;
at least one response means for modifying electrical output from said at least one buck/boost power converter responsive to said at least one means for providing feedback from said at least one load management system.

17. An improved power system for a spacecraft for providing negatively grounded power to at least one electrical load at improved higher ambient voltages while reducing the voltage potential between said spacecraft and space plasma, said spacecraft having a spacecraft containing means, said power system having at least one means for generating electrical energy from solar energy, said at least one means for generating electrical energy from solar energy having at least one positive generator feed terminal and at least one negative generator feed terminal, and said at least one electrical load having at least one electrical load input terminal and having at least one electrical load ground terminal, said improved power system comprising:
at least one buck/boost power converter to convert energy from negatively charged input into positively charged output;
said at least one buck/boost power converter having a power converter negative input feed and at least one power converter positive output feed;
means for connecting said at least one negative generator feed terminal to said power converter negative input feed through said spacecraft containing means and electrically insulated from said spacecraft containing means;
at least one power system common ground terminal;
means for connecting said at least one positive generator feed terminal to said at least one power system common ground terminal through said spacecraft containing means and electrically insulated from said spacecraft containing means;

means for connecting said at least one power system common ground terminal to said spacecraft containing means;

means for connecting said at least one power converter positive output feed and said at least one electrical load input terminal; and means for connecting said at least one electrical load ground terminal and said at least one power system common ground terminal.

18. A claim according to claim 17, said at least one buck/boost power converter having at least one pulse width modulator to regulate voltage to said at least one electrical load.

19. A claim according to claim 18, said at least one buck/boost power converter having at least one coupled inductance means.

20. A claim according to claim 19, further comprising:
at least one battery management system connected to said improved power system.

21. A claim according to claim 20, further comprising:
at least one load management system connected to said improved power system.

22. A claim according to claim 21, further comprising:
at least one means for providing feedback from said at least one load management system to said power converter; and
at least one response means for modifying electrical output from said at least one power converter responsive to said at least one means for providing feedback from said at least one load management system.

23. An improved power system for a spacecraft for providing negatively grounded power to at least one electrical load at improved higher ambient voltages while reducing the voltage potential between said spacecraft and space plasma, said spacecraft having a spacecraft containing means, said power system having at least one means for generating electrical energy from solar energy, said at least one means for generating electrical energy from solar energy having at least one positive generator feed terminal and at least one negative generator feed terminal, and said at least one electrical load having at least one electrical load input terminal and having at least one electrical load ground terminal, said improved power system comprising:
at least one power system common ground terminal;
means for connecting said at least one positive generator feed terminal to said at least one power system common ground terminal through said spacecraft containing means and electrically insulated from said spacecraft containing means;
means for connecting said at least one power system common ground terminal to said spacecraft containing means;
at least one buck/boost power converter to convert energy from negatively charged input into positively charged output;
said at least one buck/boost power converter having at least one pulse width modulator to regulate voltage to said at least one electrical load;
said at least one buck/boost power converter having a power converter negative input feed and at least one power converter positive output feed;
means for connecting said at least one negative generator feed terminal to said power converter negative input feed through said spacecraft containing means and electrically insulated from said spacecraft containing means;

at least one load management system;

means for connecting said at least one power converter positive output feed of said at least one buck/boost power converter and said at least one load management system;

means for connecting said at least one load management system and said at least one electrical load input terminal;

means for connecting said at least one electrical load ground terminal and said at least one power system common ground terminal;

at least one battery management system connected to said improved power system;

at least one means for providing feedback from said at least one load management system to said at least one buck/boost power converter; and at least one response means for modifying electrical output from said at least one buck/boost power converter responsive to said at least one means for providing feedback from said at least one load management system;

so that when said power system is operating, said spacecraft containing means cooperates with said at least one means for generating electrical energy from solar energy and said at least one buck/boost power converter to positively charge said spacecraft containing means, thereby allowing an ambient operating voltage of said power system greater than 28 V at positive ion repelling potential between said spacecraft containing means and space plasma adjacent to said spacecraft, thereby reducing sputtering and contamination of said spacecraft containing means, and reducing arcing with respect to the surface of said spacecraft containing means, and to thereby permit said at least one electrical load to be negatively grounded to said at least one positive generator feed terminal, said ambient operating voltage greater than 28 V reducing ambient amperage required for a given power demand requirement, thereby permitting a smaller cross section and mass of each said means for connecting.

24. A claim according to claim 23, said at least one buck/boost power converter having at least one coupled inductance means.

25. An improved method of supplying power for a spacecraft power system for a spacecraft transporting at least one electrical load at improved higher ambient voltages while reducing the voltage potential between said spacecraft and space plasma, said spacecraft having a spacecraft containing means, said spacecraft having at least one means for generating electrical energy from solar energy, said at least one means for generating electrical energy from solar energy having at least one positive power feed terminal and at least one negative power feed terminal, and said at least one electrical load having at least one electrical load input terminal and having at least one electrical load ground terminal, said improved method comprising:

connecting said at least one positive power feed terminal and said spacecraft containing means;

converting energy from a negative input to a positive output using at least one power converter having at least one electronic energy storage element, said at least one power converter having a power converter negative input feed and at least one power converter positive output feed;

connecting said at least one negative power feed terminal to said power converter negative input feed through said spacecraft containing means and electrically insulated from said containing means;

connecting said at least one power converter positive output feed and said at least one electrical load input terminal; and connecting said at least one electrical load ground terminal and said at least one positive power feed terminal.

26. A method according to claim 25, further comprising:

said at least one power converter being at least one buck/boost power converter.

27. A method according to claim 26, further comprising:

regulating voltage to said at least one electrical load by means of at least one pulse width modulator.

28. A method according to claim 27, further comprising:

connecting at least one battery management system and said spacecraft power system.

29. A method according to claim 28, said method further comprising:

connecting at least one load management system and said spacecraft power system.

30. A method according to claim 29, further comprising:

connecting at least one means for providing feedback from said at least one load management system; and modifying electrical output from said at least one buck/boost power converter responsive to said at least one means for providing feedback.

31. A method according to claim 30, further comprising:

said at least one buck/boost power converter having at least one coupled inductance means.

32. An improved method of supplying power for a spacecraft power system for a spacecraft transporting at least one electrical load at improved higher ambient voltages while reducing the voltage potential between said spacecraft and space plasma, said spacecraft having a spacecraft containing means, said spacecraft having at least one means for generating electrical energy from solar energy, said at least one means for generating electrical energy from solar energy having at least one positive power feed terminal and at least one negative power feed terminal, and said at least one electrical load having at least one electrical load input terminal and having at least one electrical load ground terminal, said improved method comprising:

converting energy from a negative input to a positive output using at least one power converter having at least one electronic energy storage element, said at least one power converter having a power converter negative input feed and at least one power converter positive output feed;

connecting said at least one negative power feed terminal to said power converter negative input feed through said spacecraft containing means and electrically insulated from said spacecraft containing means;

connecting said at least one positive power feed terminal to at least one power system common ground terminal through said spacecraft containing means and electrically insulated from said spacecraft containing means;

connecting said at least one power system common ground terminal to said spacecraft containing means;

connecting said at least one power converter positive output feed and said at least one electrical load input terminal; and connecting said at least one electrical load ground terminal to said at least one power system common ground terminal.

33. A method according to claim 32, further comprising:
said at least one power converter being at least one buck/boost power converter.

34. A method according to claim 33, further comprising:
regulating voltage to said at least one electrical load by means of a pulse width modulator.

35. A method according to claim 34, further comprising:
connecting at least one battery management system and said spacecraft power system.

36. A method according to claim 35, said method further comprising:
connecting at least one load management system and said spacecraft power system.

37. A method according to claim 36, further comprising:
connecting at least one means for providing feedback from said at least one load management system; and
modifying electrical output from said at least one buck/boost power converter responsive to said at least one means for providing feedback.

38. A method according to claim 37, further comprising:
said at least one buck/boost power converter having at least one coupled inductance means.

39. An improved method of supplying power for a spacecraft power system for a spacecraft transporting at least one electrical load at improved higher ambient voltages while reducing the voltage potential between said spacecraft and space plasma, said spacecraft having a spacecraft containing means, said spacecraft having at least one means for generating electrical energy from solar energy, said at least one means for generating electrical energy from solar energy having at least one positive power feed terminal and at least one negative power feed terminal, and said at least one electrical load having at least one electrical load input terminal and having at least one electrical load ground terminal, said improved method comprising:
converting energy from a negative input to a positive output using at least one buck/boost power converter, said at least one buck/boost power converter having a power converter negative input feed and at least one power converter positive output feed;
connecting said at least one negative power feed terminal to said power converter negative input feed through said spacecraft containing means and electrically insulated from said containing means;
connecting said at least one positive power feed terminal to at least one power system common ground terminal through said spacecraft containing means and electrically insulated from said containing means;
connecting said at least one power system common ground terminal to said spacecraft containing means;
connecting said at least one power converter positive output feed and said at least one electrical load input terminal; and
connecting said at least one electrical load ground terminal to said at least one power system common ground terminal.

40. A method according to claim 39, further comprising:
regulating voltage to said at least one electrical load by means of a pulse width modulator.

41. A method according to claim 40, further comprising:
connecting at least one battery management system and said spacecraft power system.

42. A method according to claim 41, said method further comprising:

connecting at least one load management system and said spacecraft power system.

43. A method according to claim 42, further comprising:
connecting at least one means for providing feedback from said at least one load management system;
modifying electrical output from said at least one buck/boost power converter responsive to said at least one means for providing feedback.

44. A method according to claim 43, further comprising:
said at least one buck/boost power converter having at least one coupled inductance means.

45. An improved method of supplying power for a spacecraft power system for a spacecraft transporting at least one electrical load at improved higher ambient voltages while reducing the voltage potential between said spacecraft and space plasma, said spacecraft having a spacecraft containing means, said spacecraft having at least one means for generating electrical energy from solar energy, said at least one means for generating electrical energy from solar energy having at least one positive power feed terminal and at least one negative power feed terminal, and said at least one electrical load having at least one electrical load input terminal and having at least one electrical load ground terminal, said improved method comprising:
converting energy from a negative input to a positive output using at least one buck/boost power converter, said at least one buck/boost power converter having a power converter negative input feed and at least one power converter positive output feed;
connecting said at least one negative power feed terminal to said power converter negative input feed through said spacecraft containing means and electrically insulated from said spacecraft containing means;
connecting said at least one positive power feed terminal to at least one power system common ground terminal through said spacecraft containing means and electrically insulated from said spacecraft containing means;
connecting said at least one power system common ground terminal to said spacecraft containing means;
connecting said at least one power converter positive output feed to at least one load management system;
connecting said at least one load management system and said at least one electrical load input terminal;
connecting said at least one electrical load ground terminal and said at least one power system common ground terminal;
connecting at least one means for providing feedback from said at least one load management system;
modifying electrical output from said at least one buck/boost power converter responsive to said at least one means for providing feedback;
regulating voltage to said at least one electrical load by means of a pulse width modulator;
connecting at least one battery management system to said at least one spacecraft power system
so that said containing means of said spacecraft is positively charged by said positive power feed terminal from said at least one means for generating electrical energy, thereby allowing a greater ambient operating voltage at positive ion repelling potential between said containing means and space plasma adjacent to said spacecraft, thereby reducing sputtering and contamination of said exterior surface of said spacecraft, and reducing arcing with respect to said exterior surface, thereby permitting said at least one electrical load to be negatively grounded to said at least one positive power feed terminal, and thereby reducing the ambient amperage required for a given power demand requirement.

46. A method according to claim 45, further comprising:
said at least one buck/boost power converter having at least one coupled inductance means.

* * * * *